US012579280B2

(12) United States Patent
Lekies et al.

(10) Patent No.: US 12,579,280 B2
(45) Date of Patent: Mar. 17, 2026

(54) SYSTEMS AND METHODS FOR VULNERABILITY SCANNING OF DEPENDENCIES IN CONTAINERS

(71) Applicant: Google LLC, Mountain View, CA (US)

(72) Inventors: Sebastian Lekies, Zürich (CH); Yousef Alowayed, New York, NY (US)

(73) Assignee: Google LLC, Mountain View, CA (US)

( * ) Notice: Subject to any disclaimer, the term of this patent is extended or adjusted under 35 U.S.C. 154(b) by 116 days.

(21) Appl. No.: 18/489,174

(22) Filed: Oct. 18, 2023

(65) Prior Publication Data

US 2025/0131096 A1     Apr. 24, 2025

(51) Int. Cl.
 *G06F 21/57*         (2013.01)
(52) U.S. Cl.
 CPC ...... *G06F 21/577* (2013.01); *G06F 2221/034* (2013.01)
(58) Field of Classification Search
 None
 See application file for complete search history.

(56) References Cited

U.S. PATENT DOCUMENTS

| | | | | |
|---|---|---|---|---|
| 11,276,911 | B2 * | 3/2022 | Li | H01R 12/73 |
| 11,809,575 | B1 * | 11/2023 | Reddy | G06F 21/577 |
| 2016/0350081 | A1 * | 12/2016 | Kumar | G06F 8/30 |
| 2017/0068676 | A1 * | 3/2017 | Jayachandran | G06F 16/125 |
| 2017/0177860 | A1 * | 6/2017 | Suarez | G06F 21/53 |
| 2017/0255462 | A1 * | 9/2017 | Azagury | G06F 9/30145 |
| 2017/0329277 | A1 * | 11/2017 | Ushikubo | G03G 15/0886 |
| 2018/0173502 | A1 * | 6/2018 | Biskup | G06F 21/56 |
| 2019/0005246 | A1 * | 1/2019 | Cherny | G06F 21/577 |
| 2019/0260716 | A1 * | 8/2019 | Lerner | H04L 63/0876 |
| 2020/0117434 | A1 * | 4/2020 | Biskup | G06F 9/445 |
| 2025/0030719 | A1 * | 1/2025 | Das | H04L 63/1433 |

OTHER PUBLICATIONS

Anais Urlichs, "Software Supply Chain Security with Trivy: Generating SBOMs", AquaSec Blog, Apr. 12, 2022. (Year: 2022).*

* cited by examiner

*Primary Examiner* — Kaveh Abrishamkar
(74) *Attorney, Agent, or Firm* — Lowenstein Sandler LLP

(57) ABSTRACT

A method includes identifying, by a processing device, a set of parameters to generate a container image for a container. The parameters comprise one or more dependencies associated with running the container in a cloud-based environment. A manifest file referencing the one or more dependencies is obtained and the container image is generated based on the set of parameters, wherein the manifest file is stored in a predetermined location associated with the container.

17 Claims, 5 Drawing Sheets

200

Receive an instruction to generate an image
210

Obtain the parameters related to the image
220

Generate a manifest file for the image
230

Generate an image based on the parameters and that includes the manifest file
240

| MANIFEST FILE METADATA TABLE 310 | |
|---|---|
| Field 320 | Value 330 |
| Dependency$_a$ | Sting |
| Version | Sting |
| Path | Sting |
| Type | Distro Type |
| Patched Vul$_{a-1}$ | Sting |
| ... | ... |
| Patched Vul$_{a-n}$ | Sting |
| ... | ... |
| Dependency$_b$ | Sting |
| Version | Sting |
| Path | Sting |
| Type | Distro Type |
| Patched Vul$_{b-1}$ | Sting |
| ... | ... |
| Patched Vul$_{b-n}$ | Sting |
| ... | ... |
| Dependency$_z$ | Sting |
| ... | ... |

Identify an image for which to generate a security scanning report
410

Locate the manifest file in the image
420

Identify existing vulnerabilities associated with the dependencies in the manifest file
430

Generate a security scanning report for the image
440

SYSTEMS AND METHODS FOR VULNERABILITY SCANNING OF DEPENDENCIES IN CONTAINERS

TECHNICAL FIELD

The disclosed implementations relate generally to scanning tools. More particularly, the disclosed implementations relate to methods and systems for scanning the dependencies of containers to determine security vulnerabilities.

BACKGROUND

Platform-as-a-Service (PaaS) system is a category of cloud computing services that can include software and/or hardware facilities for facilitating the execution of applications (web applications, mobile applications, etc.) in a cloud computing environment (the "cloud"). Cloud computing is a computing paradigm in which a user engages a "cloud provider" to execute a program on computer hardware owned and/or controlled by the cloud provider. A cloud provider can allow users to provision, instantiate, run, and manage a modular bundle that includes a computing platform and one or more applications without the complexity of building and maintaining the infrastructure typically associated with developing and launching the applications. In particular, the cloud provider can provide an interface that a user can use to requisition virtual machines and/or containers along with associated resources such as security policies, processors, storage, and network services, etc., as well as an interface to install and execute the user's applications and files on the containers and/or virtual machines.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

An aspect of the disclosure provides a computer-implemented method that identifies, by a processing device, a set of parameters to generate a container image for a container. The parameters comprise one or more dependencies associated with running the container in a cloud-based environment. A manifest file referencing the one or more dependencies is obtained and the container image is generated based on the set of parameters, wherein the manifest file is stored in a predetermined location associated with the container.

A further aspect of the disclosure provides a computer-implemented method that obtains a manifest file from a container image. The manifest file references one or more dependencies associated with running a container deployed from the container image in a cloud-based environment. The method further identifies one or more vulnerabilities associated with the one or more dependencies referenced in the manifest file and generates a security scanning report referencing one or more vulnerabilities.

A further aspect of the disclosure provides a system comprising: a memory; and a processing device, coupled to the memory, the processing device to perform a method according to any aspect or implementation described herein.

A further aspect of the disclosure provides a non-transitory computer-readable medium comprising instructions that, responsive to execution by a processing device, cause the processing device to perform operations according to any aspect or implementation described herein.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 3 illustrates an example manifest file metadata table, in accordance with one implementation of the present disclosure.

DETAILED DESCRIPTION

Figure 1:
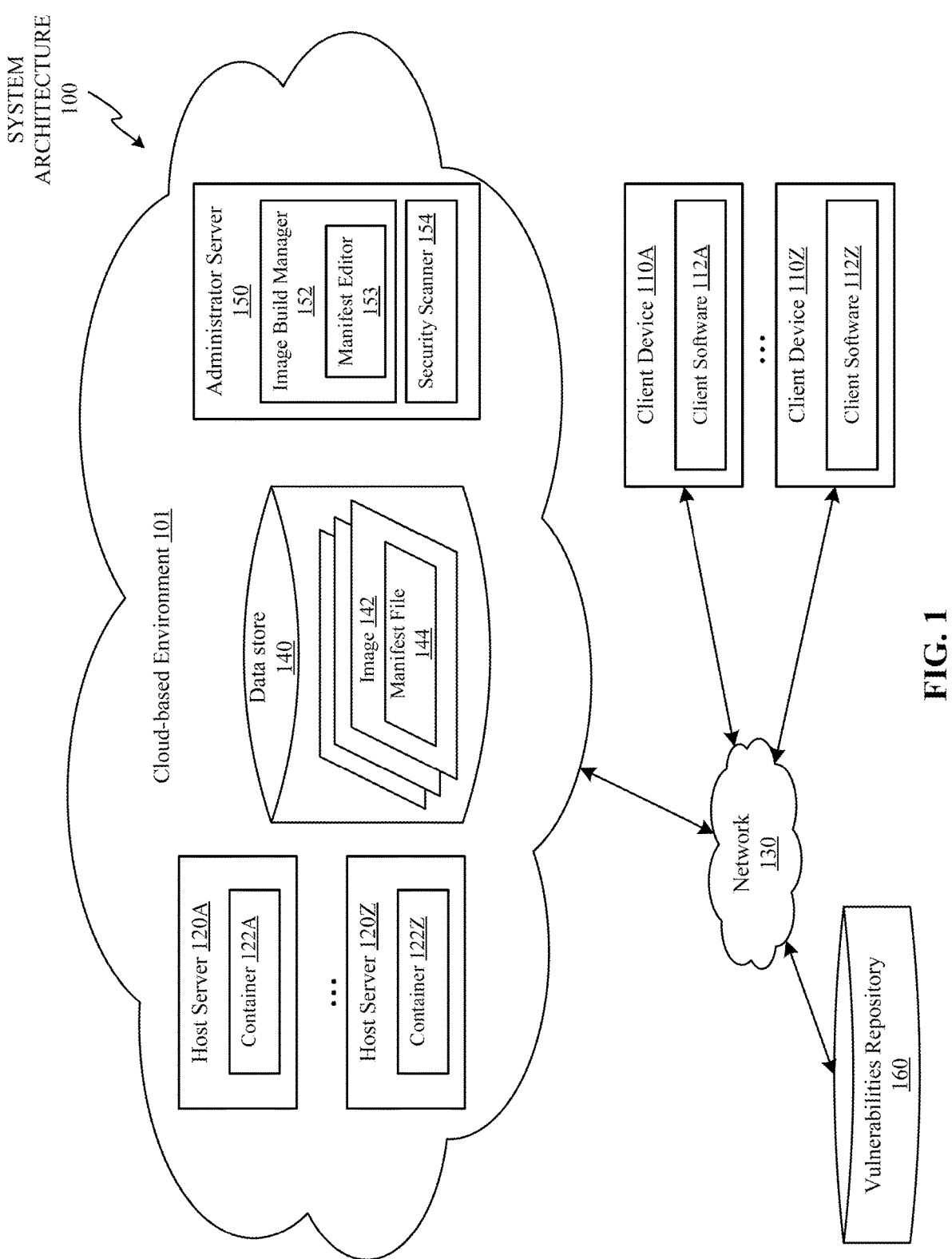
FIG. 1 illustrates an example of system architecture for enabling sub-window interaction, in accordance with implementations of the disclosure.

A containerized computing services platform may implement a Platform-as-a-Service (PaaS) system. The PaaS system provides resources and services (e.g., micro-services) for the development and execution of applications owned or managed by one or more users. A PaaS system provides a platform and environment that allow users to build applications and services in a clustered compute environment (the "cloud"). PaaS system offerings include services that use operating system (OS) level virtualization to deliver software in packages called containers. A container is a standard unit of software that packages code, libraries and configuration files so the application can run from one computing environment to another. An application that runs inside a container can be referred to as a "containerized application." Containers may be deployed and run distributed applications without launching an entire virtual machine for each application. Programs running inside a container can only see the container's contents and devices assigned to the container. Containers may communicate with each other through one or more channels, and may be run by a single OS kernel, allowing for use of fewer resources than virtual machines. Typically, a system builds a container image from which the container can be executed. As such, the container can be immutable. That is, the container cannot be modified during its lifespan (e.g., cannot be updated, patched, be subjected to configuration changes, etc.). An image can refer to data representing executables and files of an application (e.g., a container) used to deploy functionality for a runtime instance of the application. In particular, an image is a static file with executable code that can create the corresponding application on a host system.

Security scanners, such as vulnerability scanners, can be used to identify security weaknesses and flaws in systems and software associated with the container. In particular, vulnerability scanning is used to verify the security state of network-connected assets such as servers, routers, firewalls, load balancers, applications, etc. The security weakness and flaws are typically referred to as "vulnerabilities," which can include weaknesses in either the hardware of the computer system, and/or the software that runs on the hardware. Vulnerabilities can be exploited by a threat actor, such as an attacker, to cross privilege boundaries (e.g., perform unauthorized actions) within the computer system. Identifying vulnerabilities in network-connected assets and determining the associated risk of the identified vulnerabilities is an important aspect of network security.

One type of vulnerability scanning is dependency scanning, which analyzes a container's software dependencies for known vulnerabilities. A software dependency (hereafter "dependency") is a code library, package, framework, and/or any other software that a container (and/or the containerized application) relies on to function and work properly. For example, if a container (via the containerized application) uses a library to query a database, the library is a dependency of the container as the container depends on that library to function properly.

In current systems, once a system generates (e.g., builds) a container, the system also generates a package file which typically contains additional metadata describing certain binaries or packages installed on the container. For example, the package file can include a size of the container, the instruction set architecture used (e.g., x64, x86, etc.), a Uniform Resource Locator (URL), version identifiers (e.g., unique version names or unique version numbers to unique states of computer software), etc. This package file is appended to the container image and not an internal part of the container image itself (e.g., not searchable within the container or its containerized application). Current security scanners can access these appended package files, determine (e.g., via a reverse engineering process) some of the dependencies of the containerized application based on the data stored in the package file, and identify the vulnerabilities of the container.

However, in some systems, a server can automatically detach (e.g., remove) the appended package file from the container image prior to storing the container on a database or running the container image in a cloud. As such, current security scanners are unable to determine any of the dependencies associated with the container, and thus unable to identify the vulnerabilities of the container. Additionally, the data in the package file does not list all of the dependencies, but rather, metadata describing certain binaries or packages installed on the container. As such, security scanners may be unable to determine all of the dependencies associated with a container solely from its package file.

Aspects and implementations of the present disclosure address the above and other deficiencies using a mechanism for generating and storing, within a container, a manifest file referencing the dependencies of the container. In particular, an image build system can provide a user with software tools (e.g., buttons, linkers, compilers, code editors, GUI designers, assemblers, debuggers, performance analysis functions, a manifest editor, etc.) to generate a container. The manifest editor can provide the user with the capability to list the dependencies (and other related data) that the desired container relies on. For example, the manifest editor can enable the user to list the packages and libraries used, the corresponding versions of the packages and libraries, known vulnerabilities or patches associated with the packages and libraries, etc. When generating the container image, the manifest file can be stored in the container (e.g., within a directory of the container). To determine the vulnerabilities of the dependencies of the container, a security scanner can obtain the manifest file from the container and generate a security scanning report listing the known vulnerabilities of the dependencies listed in the manifest file. To generate the security scanning report, the security scanner can, for example, identify the dependencies listed in manifest file and obtain, from a vulnerabilities repository, the known vulnerabilities of the identified dependencies.

In some implementations, the manifest file can be generated automatically by the image build manager. For example, the image build manager can track which dependencies are selected for the container and list the selected dependencies in the manifest file. In other implementations, the dependencies can be listed in a metadata table of the manifest file by a combination of user input and automatic detection.

Aspects of the present disclosure result in improved performance of security scanners. In particular, the aspects of the present disclosure enable security scanners to accurately determine the vulnerabilities associated with the dependencies of a container, regardless of whether an appended packages file is removed by a server. This allows the user to better protect their containers from possible attacks by threat actors.

While aspects of the present disclosure are typically discussed with reference to containers, it should be understood that the system and methods of the present disclosure can be used to determine the dependencies and/or vulnerabilities of any type of software (e.g., software applications, middleware, etc.), such as, for example, virtual machines, software images, executable files, software pods, or other types of software artifacts or executable programs.

FIG. 1 is an example of a system architecture 100 for enabling vulnerability scanning of dependencies in containers, in accordance with aspects of the disclosure. The system architecture 100 includes a cloud-based environment 101 connected to client devices 110A-110Z (generally referred to as "client device(s) 110" herein) via a network 130. Although the system architecture 100 is described in the context of a cloud-based environment 101, which can enable communication between host servers 120A-120Z (generally referred to as "host server(s) 120" herein) and administrator server 150 in the cloud-based environment 101 and with client devices 110A-110Z over the network 130 to store and share data, it can be understood that the implementations described herein can also apply to systems that are locally interconnected.

In some implementations, the system architecture 100 can be used in a containerized computing services platform. A containerized computing services platform can include a Platform-as-a-Service (PaaS) system. The PaaS system provides resources and services for the development and execution of containers. A PaaS system provides a platform and environment that allow users to build containerized applications and services in a clustered compute environment (the "cloud"). Although implementations of the disclosure are described in accordance with a certain type of system, this should not be considered as limiting the scope or usefulness of the features of the disclosure. For example, the features and techniques described herein can be used with other types of multi-tenant systems and/or containerized computing services platforms.

While aspects of the present disclosure describe hardware and software as implemented in a PaaS environment, it should be noted that in other implementations, certain or all hardware and software can also be implemented in an Infrastructure-as-a-Service (IaaS) environment, or other cloud-based environments. Additionally, while for simplicity of illustration, FIG. 1 depicts a single cloud-based environment 101, aspects of the present disclosure can be implemented to perform vulnerability scanning of dependencies in containers across multiple cloud-based environments.

The cloud-based environment 101 can include one or more host servers 120A-120Z, administrator server 150, and data store 140. In some implementations, one or more of the host servers 120A-120Z can host a container 122A-122Z (generally referred to as "container 122" herein). The host server 120A-120Z selected to host the container 122A-122Z can be based on certain load-balancing techniques, service level agreements, performance indicators, or the like. Administrator server 150 can host image build manager 152 and/or security scanner 154.

In some implementations, the cloud-based environment 101 refers to a collection of physical machines that include host servers 120A-120Z to execute containers 122A-122Z and/or process containerized applications (not shown) via container 122A-122Z. A host server 120A-120Z providing computing functionality can provide the execution environment for the containers 122A-122Z of the PaaS system. In some implementations, one or more virtual machines (VMs) can be hosted on a physical machine, such as host server 120A-120Z, and each can be executed by a respective operating system. Each virtual machine can run one or more containers 122A-122Z. In other implementations, one or more containers 122A-122Z can run directly on the hardware of host servers 120A-120Z.

Container 122A-122Z can run a corresponding containerized application. In some implementations, the containerized application can provide a respective user interface for presentation on the client devices 110A-110Z. The user interface can be presented via a web browser (not shown). Alternatively, the client device 110A-110Z includes a local (mobile or desktop) application (not shown) that provides the user interface and communicates with the containerized application.

Containers 122A-122Z can be executed from a software image 142 (referred to as "image 142"). An image 142 can refer to data representing executables and files of a container (and/or the containerized application) used to deploy functionality for a runtime instance of the container. In particular, an image is a static file with executable code that can create the corresponding container on host server 120A-120Z. In some implementations, each image 142 can be built from pre-existing application components and source code. In one implementation, the images 142 can be built using image build manager 152. In other implementations, the image 142 can be built using other types of containerization technologies. Each image 142A-142N can include data associated with the containerized application and the dependencies (e.g., libraries, configuration information, etc.) associated with the container and/or containerized application. The image 142 of each corresponding container 122A-122Z can be stored on data store 140.

Data store 140 can be a persistent storage that is capable of storing images 142. Data store 140 can be hosted by one or more storage devices, such as main memory, magnetic or optical storage-based disks, tapes or hard drives, NAS, SAN, and so forth. In some implementations, data store 140 can be a network-attached file server, while in other implementations data store 140 can be some other type of persistent storage such as an object-oriented database, a relational database, and so forth, that can be hosted by cloud-based environment 101 or one or more different machines coupled to cloud-based environment 101. In some implementations, data store 140 can be coupled to host server 120A-120Z, administrator server 150, and/or client device 110A-110N via network 130.

Network 130 can be a public network (e.g., the Internet), a private network (e.g., a local area network (LAN) or wide area network (WAN)), or a combination thereof. Network 130 can include a wireless infrastructure, which can be provided by one or more wireless communications systems, such as a wireless fidelity (Wi-Fi) hotspot connected with the network 130 or a wireless carrier system that can be implemented using various data processing equipment, communication towers, etc. Additionally or alternatively, network 130 can include a wired infrastructure (e.g., Ethernet).

Image build manager 152 can provide a user with software tools to generate image 142A-142Z. The software tools can be presented to the user via client software 112A-112Z of client device 110A-110Z. In particular, each client device 110A-110Z can include client software 112A-112Z that can present, on a display device of client device 112A-112Z, a user interface (UI) displaying one or more software tools (e.g., buttons, linkers, compilers, code editors, GUI designers, assemblers, debuggers, performance analysis functions, manifest editor 153, etc.) for generating images 142A-142Z. The client software 112A-112Z can include a mobile application, a desktop application, a web browser, etc.

In some implementation, image build manager 152 can generate image 142A-142Z for a container 122A-122Z by combining a preexisting ready-to-run (e.g., pre-built) container image corresponding to core functional components of an application (e.g., a web framework, database, etc.) with source code specific to the application provided by the user. The resulting image 142A-142Z can be stored in data store 140 for subsequent use in launching instances of the image 142A-142Z for execution in the cloud-based environment 101.

Image build manager 152 can further generate a manifest file 144 for each image 142. A manifest file 144 can include data associated with the dependencies pertaining to the image 142. A dependency (e.g., a software dependency) is a code library, package, framework, and/or any other software that a container or containerized application relies on to function and work properly. The dependencies can be listed in a data structure, such as, for example, a metadata table.

In some implementations, the dependencies can be listed in the manifest file 144 based on user input received via a UI of manifest editor 153. In particular, manifest editor 153 can be a tool of image build manager 152 that can provide the user with the capability to list the dependencies (and other related data) that the desired container relies on. For example, the manifest editor can enable the user to list the packages and libraries used, the corresponding versions of the packages and libraries (e.g., unique version names or unique version numbers to unique states of computer software), known vulnerabilities or patches associated with the packages and libraries, etc. This will be explained in detail below.

In some implementations, the manifest file 144 can be generated automatically. For example, image build manager 152 can track which dependencies are selected for a container/container image and lists the selected dependencies in the manifest file 144. In some implementations, a semi-automatic process can be used by image builder 152 where the image builder tracks and lists certain dependencies that it identifies, and the user can add, edit or remove dependencies to be included in the manifest file 144. The manifest file 144 can be stored in a predetermined or specified location in the respective image 142. For example, when compiling the image 142, image build manager 152 can store the manifest file under predetermined address, location, or URL.

Security scanner 154 can be a tool used to identify and/or detect vulnerabilities from the mis-configurations or flawed programming within an image 142. In some implementations, security scanner 154 can be part of Software as a Service (SaaS) system. In particular, security scanner 154 can identify the dependencies (and/or other data) referenced by manifest file 144 and obtain, from vulnerability repository 160, a listing of the known (e.g., predefined) vulnerabilities associated with respective dependencies (and/or other data). For example, security scanner can identify software package A listed in the manifest file 144, query the vulnerability repository 160 for the known vulnerabilities of software package A, and provide the known vulnerabilities to a user via a user interface. In some implementations, security scanner 154 can generate a security scanning report. The security scanning report can include, for an image, a listing of each dependency identified with vulnerabilities, and the corresponding vulnerabilities of said dependencies. The security scanning report can be presented to a user via a user interface. For example, a user can, via a client device, 110A-110Z, request a security scanning report for a particular image, and security scanner 154 can generate and provide to the user the requested security scanning report.

Vulnerabilities repository 160 can be a persistent storage that is capable of storing data pertaining to dependencies and their known vulnerabilities. Vulnerabilities repository 160 can be hosted by one or more storage devices, such as main memory, magnetic or optical storage-based disks, tapes or hard drives, NAS, SAN, and so forth. In some implementations, Vulnerabilities repository 160 can be a network-attached file server, while in other implementations vulnerabilities repository 160 can be some other type of persistent storage such as an object-oriented database, a relational database, and so forth, that can be hosted one or more different machines coupled to cloud-based environment 101 or by cloud-based environment 101 (not shown). In some implementations, vulnerabilities repository 160 can be coupled to host server 120A-120Z, administrator server 150, and/or client device 110A-110N via network 130.

The host servers 120A-120Z and administrator server 150 can be physical machines (e.g., server machines, desktop computers, etc.) that each include one or more processing devices communicatively coupled to memory devices and input/output (I/O) devices. The processing devices can include a computer, microprocessor, logic device or other device or processor that is configured with hardware, firmware, and software to carry out some of the implementations described herein. Each of the host servers 120A-120Z can host container 122A-122Z. Administrator server 150 can host image build manager 152 and security scanner 154.

In some implementations, respective user interfaces can be web pages rendered by a web browser and displayed on the client devices 110A-110Z in a web browser window. In another implementation, the user interfaces can be included in a stand-alone application downloaded to the client devices 110A-110Z and natively running on the client devices 110A-110Z (also referred to as a "native application" or "native client application" herein).

The client devices 110A-110Z can include one or more processing devices communicatively coupled to memory devices and I/O devices. The client devices 110A-110Z can be desktop computers, laptop computers, tablet computers, mobile phones (e.g., smartphones), or any suitable computing device. The client device 110A-110Z can include components, such as an input device and an output device. A user can be authenticated by the host server 120A-120Z and/or administrator server 150 using a username and password (or other identification information) provided by a user via a user interface, such that the same client device 110A-110Z can be used by different users at different times.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2:
FIG. 2 is a flow diagram of a method showing a process for generating an image and a corresponding manifest file, in accordance with one implementation of the present disclosure.
Figure 2:
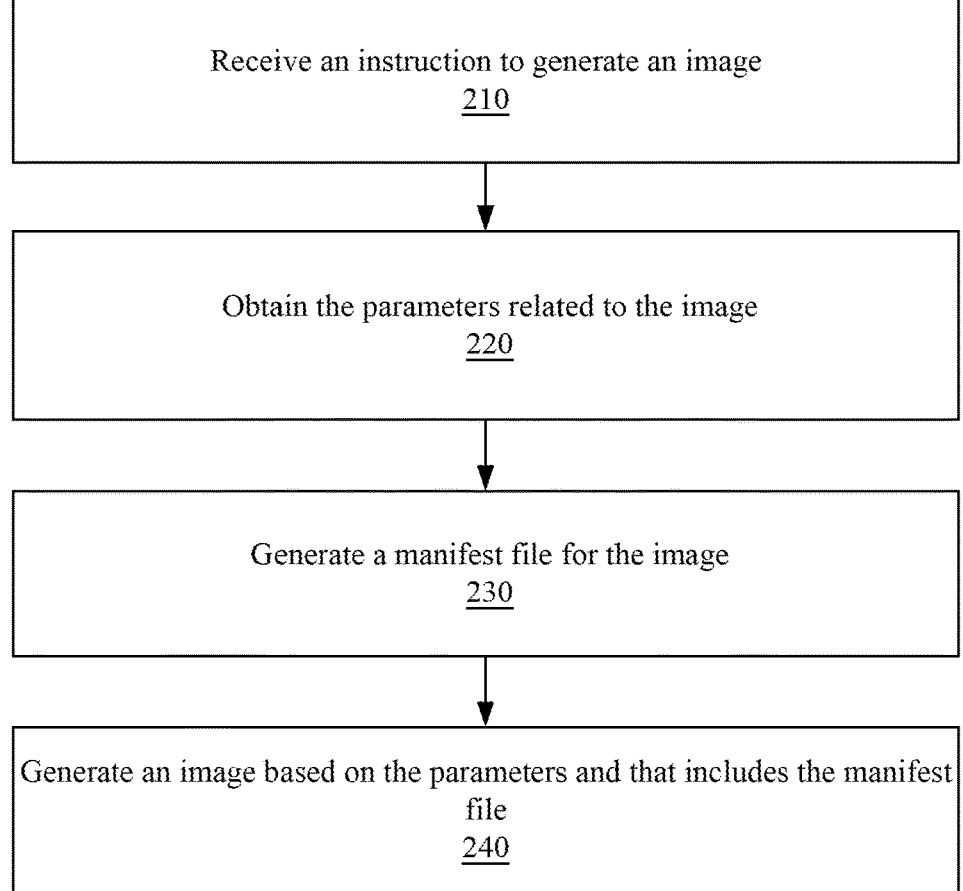

FIG. 2 depicts a flow diagram of a method 200 showing a process for generating an image and a corresponding manifest file, in accordance with some aspects of the disclosure. The method 200 is performed by processing logic that can comprise hardware (circuitry, dedicated logic, etc.), software (such as is run on a general-purpose computer system or a dedicated machine), or a combination of both. In one implementation, the method is performed by the client device 110 and/or the cloud-based environment 101 of FIG. 1, while in some other implementations one or more operations of FIG. 2 can be performed by another machine. In one implementation, a processing device of an administrator server (e.g., administrator server 150 in FIG. 1) performs method 200.

For simplicity of explanation, method 200, as well as any other method of this disclosure, is depicted and described as a series of acts. However, acts in accordance with this disclosure can occur in various orders and/or concurrently, and with other acts not presented and described herein. Furthermore, not all illustrated acts may be required to implement method 200 in accordance with the disclosed subject matter. In addition, those skilled in the art will understand and appreciate that method 200 could alternatively be represented as a series of interrelated states via a state diagram or events. Additionally, it should be appreciated that method 200 disclosed in this specification are capable of being stored on an article of manufacture (e.g., a computer program accessible from any computer-readable device or storage media) to facilitate transporting and transferring such method to computing devices. The term "article of manufacture," as used herein, is intended to encompass a computer program accessible from any computer-readable device or storage media.

At operations 210, processing logic receives an instruction to generate an image. The image can be a container image, virtual machine image, or any other type of executable software image. In an example, the instruction can be received based on a user request via client software 112A-112Z.

At operation 220, processing logic obtains the parameters related to the image. The parameters can include, for example, a pre-built container image, specific source code, configuration files, data related to selected or required dependencies, etc.

At operation 230, processing logic generates a manifest file for the image. In some implementations, the processing logic generates the manifest file automatically based on the image parameters by obtaining dependency data associated with the image. For example, the processing logic can track which dependencies are selected for the container image and list the selected dependencies in the manifest file. In some implementations, the dependencies can be listed in a metadata data structure (e.g., a metadata table) of the manifest file based on user input, or based on a combination of user input and automatic detection.

In some implementations, the manifest file can include additional data, such as, for example, vulnerability data, patch data, user input data (e.g., custom user strings), etc. The vulnerability data can include data associated with vulnerabilities, such as, for example, known vulnerabilities associated with certain dependencies. The patch-related data can include information about patches for certain vulnerabilities. A patch is a set of changes to a software or its supporting data designed to update, fix, or improve the software or supporting data (e.g., fixing security vulnerabilities and other bugs). For example, the patch-related data can indicate whether a patch exists for a certain vulnerability associated with a certain dependency used by the image. In another example, the patch-related data can indicate which vulnerabilities should be excluded from the security scanning results generated by security scanner 154. In particular, certain dependencies can have patches that fix certain vulnerabilities. An indication of these patched vulnerabilities can be listed in the manifest file, which can indicate to the security scanner 154 to exclude the corresponding vulnerabilities from the security scanning report (e.g., since such vulnerabilities are patched and may no longer present a security threat), cause security scanner 154 to indicate, via a security scanning report, that the vulnerability is patched, etc.

FIG. 3 schematically illustrates an example manifest file metadata data structure in the form of metadata table 310, in accordance with aspects of the present disclosure. Metadata table 310 can include a key-value format having a field column 320 and a value column 330. As shown, metadata table 310 can be a set of records that indicate the identifiers of the dependencies associated with the image (e.g., packages, libraries, configuration code, etc.), where each dependency (e.g., labeled as dependency$_a$, dependency$_b$, dependency$_z$) is identified by a respective string value (e.g., dependency$_a$ can be a MySQL package, dependency$_b$ can be a language package, etc.). For each dependency, an associated version is listed (e.g., a unique version name or a unique version number to a respective state of the dependency), a path is listed (e.g., a location in a directory structure), a distribution type (also referred to as a "distro") is listed (e.g., an installable operating system built supporting user programs, repositories and libraries), and one or more patched vulnerabilities (e.g., names of vulnerabilities that should be excluded from security scanning results).

Returning to FIG. 2, at operation 240, processing logic generates an image based on the parameters and that includes the manifest file. The manifest file can be located in a particular location of a directory structure of the containerized application.

Figure 4:
FIG. 4 depicts a flow diagram of a method for generating security scanning report for an image, in accordance with one implementation of the present disclosure.
Figure 4:
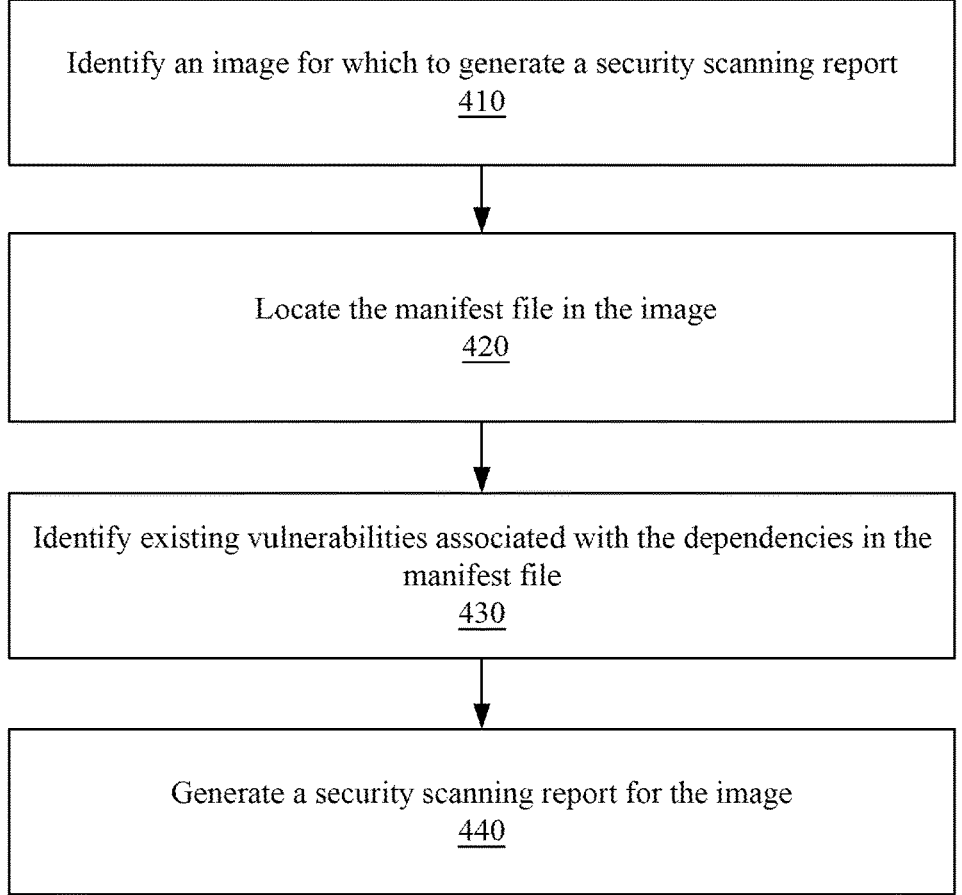

FIG. 4 depicts a flow diagram of a method 400 showing a process for generating a security scanning report for an image, in accordance with some aspects of the disclosure.

The method 200 is performed by processing logic that can comprise hardware (circuitry, dedicated logic, etc.), software (such as is run on a general-purpose computer system or a dedicated machine), or a combination of both. In one implementation, the method is performed by the client device 110 and/or the cloud-based environment 101 of FIG. 1, while in some other implementations one or more operations of FIG. 4 can be performed by another machine. In one implementation, a processing device of an administrator server (e.g., administrator server 150 in FIG. 1) performs method 400.

At operation 410, processing logic identifies an image (or the container run from the image) for which to generate a security scanning report. In some implementations, the processing logic can receive an indication of the image via user input. In some implementations, the processing logic can identify the image automatically based on a trigger event. The trigger event can include the image being uploaded to data store 140, a host server running the container associated with the image, a time period lapsing, etc. For example, in response to the image being uploaded to data store 140 or run on host server 120A, the processing logic can identify the image as a candidate for which to generate a security scanning report.

At operation 420, processing logic locates the manifest file in the image. To locate the manifest file, the processing logic can search the appropriate directory or predetermined location in the image.

At operation 430, processing logic identifies existing vulnerabilities associated with the dependencies in the manifest file. For example, the processing logic can identify the dependencies listed in the manifest file and search for these dependencies in a vulnerability repository. The processing logic can then obtain, from the vulnerabilities repository, the vulnerabilities associated with the dependencies.

At operation 440, processing logic generates a security scanning report for the image. The security scanning report can list the dependencies and associated vulnerabilities. In some implementations, the security scanning report can omit certain vulnerabilities. For example, if the manifest file indicates that a vulnerability has been patched, the processing logic can exclude that vulnerability from the report or indicate that the vulnerability has been patched.

Figure 5:
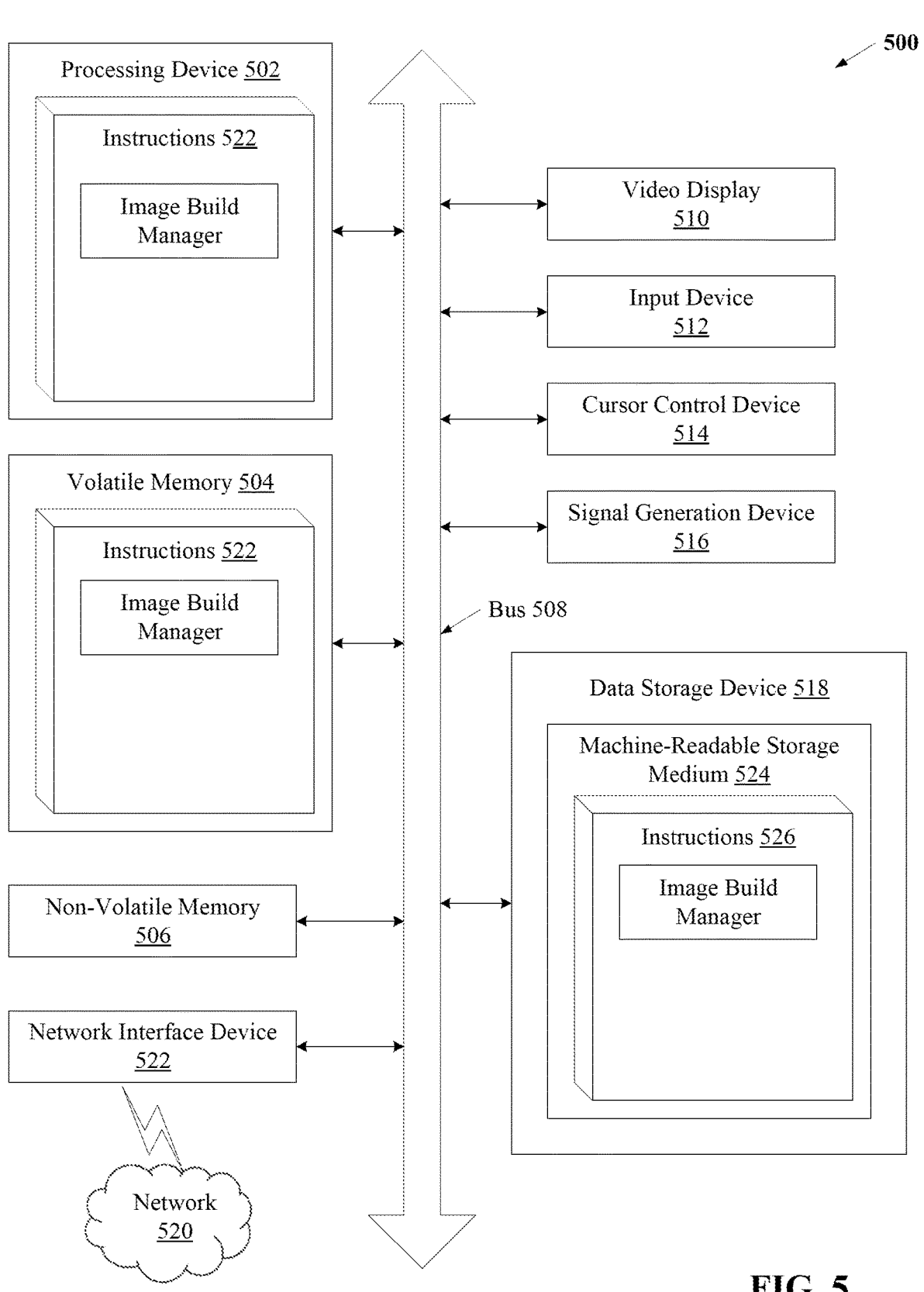
FIG. 5 depicts a block diagram of an example computing device operating in accordance with one or more aspects of the present disclosure.

FIG. 5 depicts a block diagram of a computer system operating in accordance with one or more aspects of the present disclosure. In certain implementations, computer system 500 can be connected (e.g., via a network, such as a Local Area Network (LAN), an intranet, an extranet, or the Internet) to other computer systems. Computer system 500 can operate in the capacity of a client device. Computer system 500 can operate in the capacity of a server or a client computer in a client-server environment. Computer system 500 can be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 can include a processing device 502, a volatile memory 504 (e.g., random access memory (RAM)), a non-volatile memory 506 (e.g., read-only memory (ROM) or electrically-erasable programmable ROM (EEPROM)), and a data storage device 518, which can communicate with each other via a bus 508.

Processing device 502 can be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 can further include a network interface device 522. Computer system 500 also can include a video display unit 510 (e.g., an LCD), an input device 512 (e.g., a keyboard, an alphanumeric keyboard, a motion sensing input device, touch screen), a cursor control device 514 (e.g., a mouse), and a signal generation device 516.

Data storage device 518 can include a non-transitory machine-readable storage medium 524 on which can store instructions 526 encoding any one or more of the methods or functions described herein, including instructions encoding components of client device of FIG. 1 for implementing methods 200 and 400.

Instructions 526 can also reside, completely or partially, within volatile memory 504 and/or within processing device 502 during execution thereof by computer system 500, hence, volatile memory 504 and processing device 502 can also constitute machine-readable storage media.

While machine-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein can be implemented by discrete hardware components or can be integrated in the functionality of other hardware components such as ASICS, FPGAs, DSPs or similar devices. In addition, the methods, components, and features can be implemented by firmware modules or functional circuitry within hardware devices. Further, the methods, components, and features can be implemented in any combination of hardware devices and computer program components, or in computer programs.

Unless specifically stated otherwise, terms such as "receiving," "determining," "sending," "displaying," "identifying," "selecting," "excluding," "creating," "adding," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and cannot have an ordinal meaning according to their numerical designation.

Examples described herein also relate to an apparatus for performing the methods described herein. This apparatus can be specially constructed for performing the methods described herein, or it can comprise a general-purpose computer system selectively programmed by a computer program stored in the computer system. Such a computer program can be stored in a computer-readable tangible storage medium.

The methods and illustrative examples described herein are not inherently related to any particular computer or other apparatus. Various general-purpose systems can be used in accordance with the teachings described herein, or it can prove convenient to construct more specialized apparatus to perform methods 400 and 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:

obtaining a manifest file from a container image, wherein the manifest file references one or more dependencies associated with running a container deployed from the container image in a cloud-based environment;

identifying one or more vulnerabilities associated with the one or more dependencies referenced in the manifest file;

generating a security scanning report referencing the one or more vulnerabilities; and excluding, from the security scanning report, a vulnerability based on an indication in the manifest file that the vulnerability includes a patch.

2. The method of claim 1, wherein the manifest file is obtained from the container image by a security scanner tool.

3. The method of claim 1, further comprising:

generating the manifest file, wherein generating the manifest file comprises identifying which dependencies are selected for the container image and listing the identified dependencies in the manifest file.

4. The method of claim 1, further comprising:

generating the manifest file based on received user input referencing the one or more dependencies.

5. The method of claim 1, wherein the manifest file comprises a set of records indicating, for a dependency of the one or more dependencies, a version of the dependency, a distribution type of the dependency, a corresponding location in a directory structure, and patch data related to a vulnerability of the dependency.

6. The method of claim 1, wherein the manifest file is stored in a predetermined location associated with the container.

7. A system comprising:

a memory device; and a processing device coupled to the memory device, the processing device to perform operations comprising:

obtaining a manifest file from a container image, wherein the manifest file references one or more dependencies associated with running a container deployed from the container image in a cloud-based environment;

identifying one or more vulnerabilities associated with the one or more dependencies referenced in the manifest file;

generating a security scanning report referencing the one or more vulnerabilities; and excluding, from the security scanning report, a vulnerability based on an indication in the manifest file that the vulnerability includes a patch.

8. The system of claim 7, wherein the operations further comprise:

identifying the one or more dependencies to generate the container image;

obtaining the manifest file referencing the one or more dependencies; and generating the container image based on the one or more dependencies, wherein the manifest file is stored in a predetermined location associated with the container.

9. The system of claim 7, wherein the operations further comprise:

generating the manifest file, wherein generating the manifest file comprises identifying which dependencies are selected for the container image and listing the identified dependencies in the manifest file.

10. The system of claim 7, wherein the operations further comprise:

generating the manifest file based on received user input referencing the one or more dependencies.

11. The system of claim 7, wherein the manifest file comprises a set of records indicating, for a dependency of the one or more dependencies, a version of the dependency, a distribution type of the dependency, a corresponding location in a directory structure, and patch data related to a vulnerability of the dependency.

12. The system of claim 8, wherein the predetermined location comprises a location in a directory structure of the container image.

13. A non-transitory computer-readable medium comprising instructions that, responsive to execution by a processing device, cause the processing device to perform operations comprising:

obtaining a manifest file from a container image, wherein the manifest file references one or more dependencies associated with running a container deployed from the container image in a cloud-based environment;

identifying one or more vulnerabilities associated with the one or more dependencies referenced in the manifest file;

generating a security scanning report referencing the one or more vulnerabilities; and excluding, from the security scanning report, a vulnerability based on an indication in the manifest file that the vulnerability includes a patch.

14. The non-transitory computer-readable medium of claim 13, wherein the manifest file is obtained from the container image by a security scanner tool.

15. The non-transitory computer-readable medium of claim 13, wherein the operations further comprise:

generating the manifest file, wherein generating the manifest file comprises identifying which dependencies are selected for the container image and listing the identified dependencies in the manifest file.

16. The non-transitory computer-readable medium of claim 13, wherein the operations further comprise:

generating the manifest file based on received user input referencing the one or more dependencies.

17. The non-transitory computer-readable medium of claim 13, wherein the manifest file comprises a set of records indicating, for a dependency of the one or more dependencies, a version of the dependency, a distribution type of the dependency, a corresponding location in a directory structure, and patch data related to a vulnerability of the dependency.

* * * * *